United States Patent [19]

Durham

[11] Patent Number: 4,821,332

[45] Date of Patent: Apr. 11, 1989

[54] METHOD AND APPARATUS FOR IMAGE CAPTURE OF INFORMATION ON DOCUMENTS

[75] Inventor: Thomas J. Durham, Garland, Tex.

[73] Assignee: BancTec Inc., Dallas, Tex.

[21] Appl. No.: 17,093

[22] Filed: Feb. 20, 1987

[51] Int. Cl.⁴ ............................................. G06K 9/00
[52] U.S. Cl. ...................................... 382/7; 235/487; 356/71; 382/51; 382/65
[58] Field of Search ............... 382/7, 51, 65; 235/487; 356/71

[56] References Cited

U.S. PATENT DOCUMENTS

| | | | |
|---|---|---|---|
| 4,326,258 | 4/1982 | DeLaguardia | 382/7 |
| 4,396,902 | 8/1983 | Warthan et al. | 382/65 |
| 4,542,829 | 9/1985 | Emery et al. | 382/7 |
| 4,590,606 | 5/1986 | Rohrer | 382/51 |

Primary Examiner—Leo H. Boudreau
Attorney, Agent, or Firm—Kenneth R. Glaser

[57] ABSTRACT

Method and apparatus for enhancing the image capture of data, such as MICR characters and handwritten and printed information from the face of financial documents having background patterns and illustrations thereon. The documents are back lighted with sufficient illuminating intensity to wash out the less opaque patterns and illustrations so as to enhance the visibility and image capture of the pertinent data.

8 Claims, 2 Drawing Sheets

METHOD AND APPARATUS FOR IMAGE CAPTURE OF INFORMATION ON DOCUMENTS

FIELD OF THE INVENTION

This invention relates to improvements in document processing, more particularly to improved methods and apparatus for the image capture of information on a face of the documents, and more particularly to an improved method and apparatus for illuminating the documents for increased reliability of such image capture.

BACKGROUND OF THE INVENTION

Recently, increased efforts have been devoted to improving the efficiency of reading written or printed information from the face of paper documents. For example, in the area of processing of financial documents such as checks, deposit slips, remittance advice stubs, and the like, the use of image processing technology has been receiving increased application. In accordance with typical image processing techniques, documents are transported to a scanning station at which a camera and associated electronics are used to capture and digitize all or a portion of the image of a face of each of the documents. The digitized image is stored and subsequently processed, for example, to display the image (by way of a CRT, for instance) to an operator for keying specific information into the system processor; the document images also being used, for example, for bank statement preparation and/or reproduced for archival storage on microfilm, magnetic tape, optical discs, etc.

A chief advantage of this technology is that the document images, rather than the documents, are used for viewing and processing, thus increasing the speed and overall flexibility of the document processing operation, as well as reducing or eliminating the need for retaining the documents themselves. The archiving, cataloging, and other processes which are required for record-keeping purposes can be more efficiently carried out, and additionally, the space required for such electronically-reproduced forms can be much reduced from that heretofore required.

The increasing use of background illustrations and safety patterns on checks and other items, however, poses special problems for the image processing of these finanical documents. First, these patterns and illustrations increase the amount of data bit storage required in the system processor. Secondly, the various scenes of mountains, seashores, animals, and the like which are imprinted on the checks oftentimes obscure and interfere with pertinent data from being image captured from the face of the document, especially the signatures and dollar amounts written thereon. In particular, these patterns make it difficult, if not impossible, for the camera to discriminate between the important information which is to be captured from the face of the check and the background illustrations. Amplifying this problem is that conventional image processing normally relies upon front lighting of the document and such front lighting actually enhances the background patterns which in turn further obscures the information or data which is to be detected or captured from the face of the document.

OBJECTS AND SUMMARY OF THE INVENTION

In light of the above, it is therefore an initial object of the present invention to provide a new and improved method and apparatus in an image processing system for reliably detecting and capturing information and other data imprinted or hand written on checks and other financial documents.

It is another object of the present invention to provide a new and improved method and apparatus for enhancing the ability to image capture data from the face of patterned or illustrated checks in a document processing system while at the same time minimizing data storage capacity required for same.

It is another object of the invention to provide a method and apparatus of the type described in which the undesirable effects of front-document lighting are minimized and the reflected light variations due to imprinted design patterns are minimized.

These and other objects, features and advantages will be apparent to those skilled in the art from the following detailed description, when read in conjunction with the accompanying drawings and appended claims.

In accordance with a broad aspect of the invention, an apparatus and method are provided for uniquely illuminating the financial document so as to enhance the electronic detection and image capture of imprinted and handwritten information on the face of the document, as distinguished from the background illustration or patterns on such document face. The illumination approach provides back lighting of the document so that the light passes through the document to an electronic detection means, such as a document digitizing camera, whereby the imprinted or handwritten information is emphasized or enhanced and the lighter, or less opaque, background patterns are de-emphasized or eliminated altogether.

BRIEF DESCRIPTION OF THE DRAWINGS

Preferred embodiments of the invention are illustrated in the accompanying drawings in which.

DETAILED DESCRIPTION OF THE PREFERRED EMBODIMENTS

Figure 1:
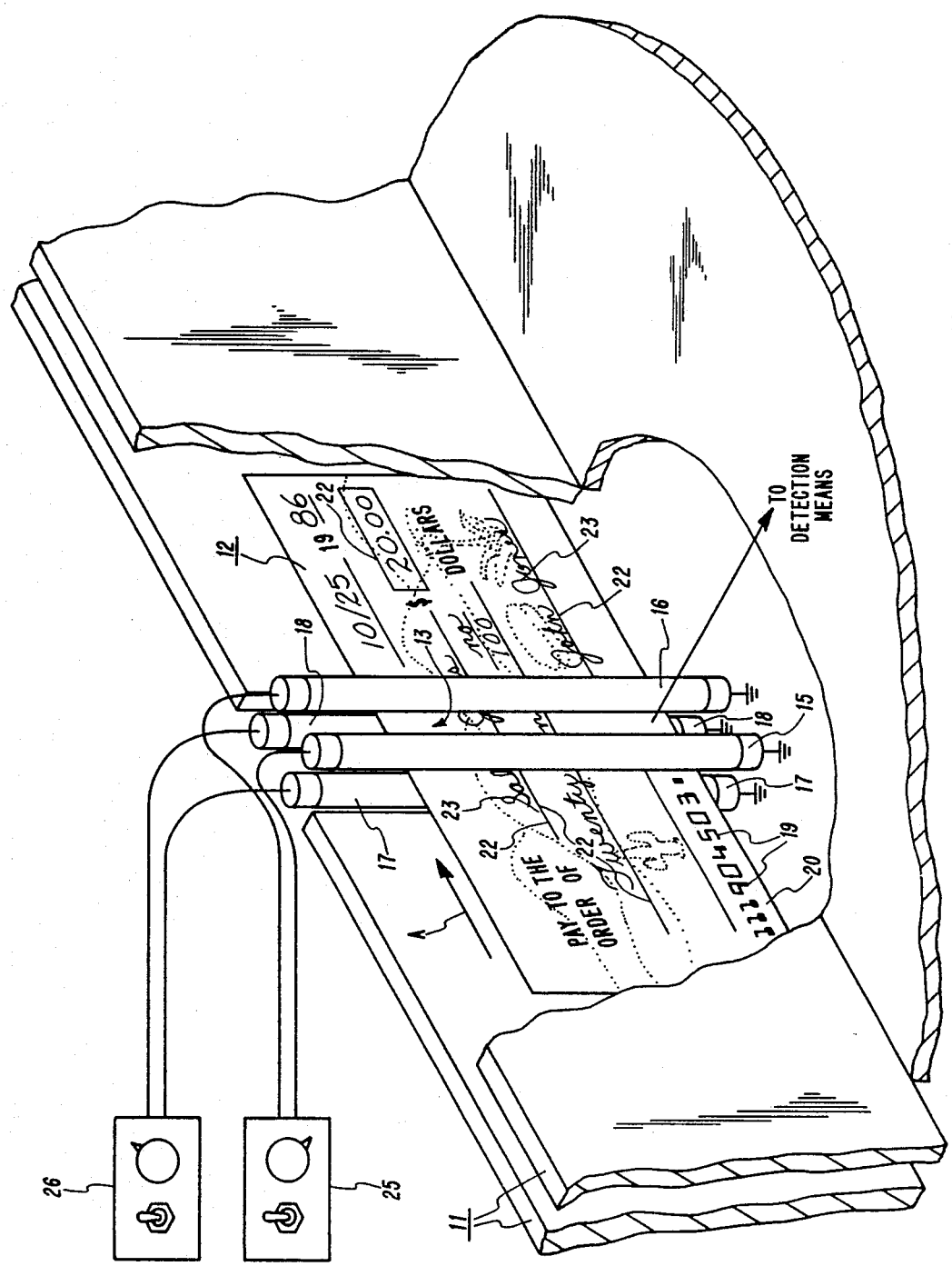
FIG. 1 is a perspective, diagrammatic illustration of one preferred embodiment of the apparatus of the present invention.

Referring now to FIG. 1, the back-lighting apparatus of the invention is used in conjunction with known image capture or detection means (not shown) which may be, for example, a conventional document digitizing camera (and associated electronics) or other type of image scanning equipment. One type of suitable image capture apparatus is described in U.S. Pat. No. 4,510,619 and assigned to the assignee of the present invention. A conventional transport assembly (not depicted) is provided by which documents 12 are manually or automatically transported (along a transport guide 11) in the direction of the arrow A into the viewing area of the image detection means. The most widely used image detection means is a digitizing camera in which a small area, such as the illustrated area 13, is scanned. As the document 12 is transported past the viewing area 13, a face of the document 12 (or selected portions thereof) are scanned, with the captured image stored and used for subsequent processing, as desired. For the purpose of this description, and for illustrative purposes, the document 12 is a check having background illustrations or patterns on the face of the check.

As illustrated, the check 12 has a number of MICR (Magnetic Ink Character Recognition) characters 19, usually along a lower marginal area or field 20. As is conventional, various lines and block 22 are provided indicating locations for entering the identification of the payor and payee, dollar amount of the instrument, etc. Of particular concern, patterns or scenic designs 23 have been pre-printed on the face of the check and, as shown, such designs may extend into the areas or fields in which the MICR characters 19 are located or in which the dollar amounts of payor/payee identifications have been handwritten or printed. Some of the printed characters 19 or handwritten data may in fact be located directly over portions of the scenic design 23 so that such design portions practically obscure the important check data.

Two lamps, such as elongated fluorescent tubes 15 and 16, are in conventional systems normally provided adjacent to the front face of the check 12. The tubes 15 and 16 are typically located side-by-side, on each side of the viewing area 13, the detection means (camera) ordinarily detecting light reflected from the document 12 (and the data on the face of the document) within the viewing area 13. It has been found that because of the nature by which light is reflected from the document 12, and particularly under the circumstances of this front lighting by itself, that the dark areas of the design 23 oftentimes completely obscure the information which is desired to be image captured, particularly the handwritten information (dollar amount, signature, etc.), and the ability of the camera to capture such information.

To overcome such problem, and in accordance with a preferred embodiment of the invention, one or more lamps, for instance fluorescent tubes 17 and 18, are disposed behind the document 12, as shown in FIG. 1. The lamps 17 and 18, in the preferred embodiment of FIG. 1, back-light each document 12 generally in the same area and in the same manner as the tubes 15 and 16, only on the back side thereof. The result is that light from the tubes 17 and 18 travels through the document 12 and tends to "wash out" the less opaque or halftone ink that is typically used for printing the scenic illustrations and safety patterns on the checks.

More specifically, the back-lighting approach of the invention takes advantage of the fact that the opacity of the medium of which the pertinent data that is desired to be image captured (dollar amounts, signatures, MICR characters) is printed or written is greater than the opacity of the ink used to print the background patterns and illustrations. Thus, the light from the tubes 17 and 18 passes through the document, and in a diffused manner through the designs and patterns 23, and is more effectively blocked by the more opaque handwritten and printed data, thus effectively washing out the background illustrations and patterns, and enhancing the image capture of the pertinent data.

Additionally, digitizing camera apparatus which is typically used to "capture" the image in many document processing image systems essentially operates on the basic principal of detecting and storing transitions between light and dark areas on the document; and by utilizing the back-lighting technique of the invention, the halftone patterned areas are washed out sufficiently so that no light-to-dark transitions appear to occur in those areas. Consequently, in addition to enhancing the capture of the relevant data from the document, the method and apparatus of the invention enables a reduction in the amount of memory that is required to accomplish the required storage and processing.

It should also be noted that in optimizing the image capture of the desired relevant data from the document, the data must in the first instance be reliably detected; and there is virtually no way to predict in advance the type, nature or quality of such data, particularly the handwritten data. Accordingly, to achieve such optimization, the back lighting of the document is preferably used in conjunction with the front lighting of the document, as shown in FIG. 1.

Furthermore, it has been found that when such combination is employed, it may be desirable to adjust the relative intensities of the light emitted from the rear tubes 17 and 18 with respect to the front tubes 15 and 16; and for this purpose, separate power supplies 25 and 26 are provided to independently control the respective intensities of the set of tubes 15 and 16 and the set of tubes 17 and 18. In addition, it may be desirable to use automatic gain type controls for regulating the intensities as a function of the amount of light reflected from the document. Because the kind, quality and nature of the particular documents being processed may vary from one geographical area of the country to the other, or even from batch to batch, some experimentation may be necessary to determine the desired respective light intensities from the front and rear lights which will optimize image capture of the desired data.

It should be appreciated that although elongated fluorescent tubes 17 and 18 have been previously described as the back-lighting source, various other types of lighting means can be alternatively employed. For example, one could use incandescent lamps or, alternatively, light sources which emit light of particular wavelength compatible with the spectral sensitivity of the particular detection means.

Figure 2:
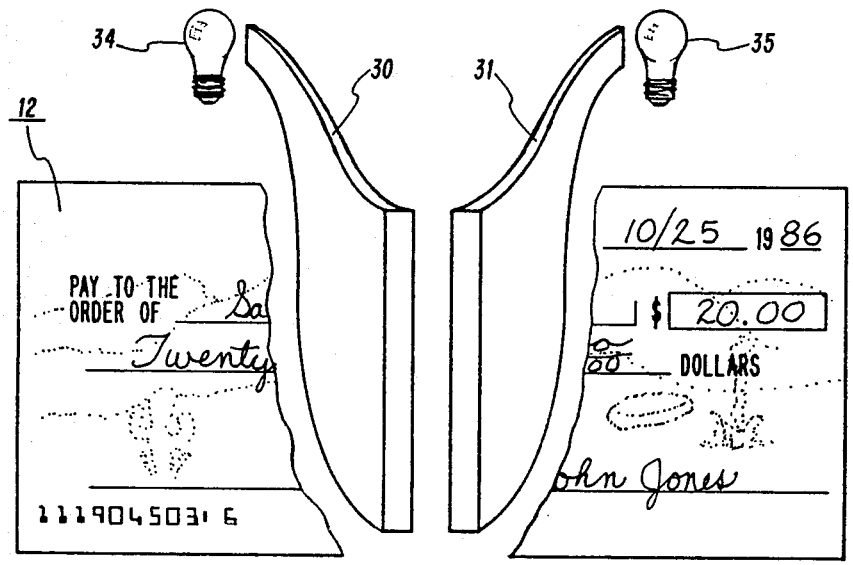
FIG. 2 is a perspective, diagrammatic illustration of an alternate embodiment of the apparatus of the invention for focusing back-light onto a particular portion of the document.

If only particular areas of the document, rather than the entire document, are of interest in particular applications, the light apparatus can be arranged to back-illuminate primarily, or only, that particular area of interest. For example, as shown in FIG. 2, the rear light arrangement may utilize a pair of vertically disposed and shaped light pipes (or other similar type light-directing means) 30 and 31 in combination with one or more incandescent (or other type) light sources 34 and 35 so as to concentrate the light on a particular vertical segment at the back of the document 12.

Figure 3:
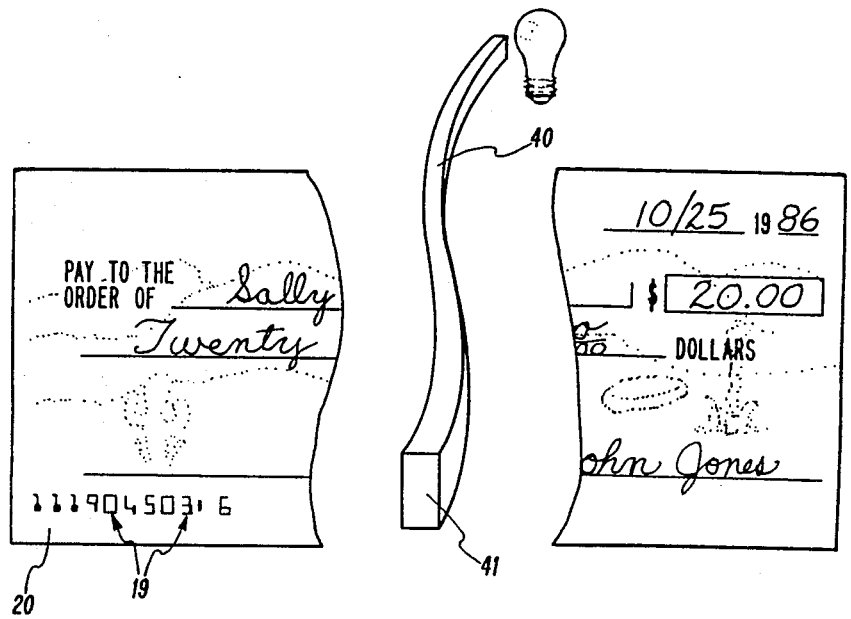
FIG. 3 is a perspective diagrammatic illustration of another alternate embodiment of the apparatus of the invention for focusing back light onto a very small selective portion of the document.

Alternatively, and as shown in FIG. 3, it may be desirable to back-illuminate, for example, only a portion of the lower marginal area 20 of the document 12 which contain the MICR characters 19; and for this purpose, a light pipe 40 having a narrow, shorter vertical height portion 41 aligned with, and adjacent to, the lower marginal area 20 can be employed with a single incandescent lamp 43 used as the light source.

Although the invention has been described and illustrated with respect to particular preferred embodiments, it is understood that such description has been made by way of example only and that numerous changes in the combination and arrangement of parts can be resorted to by those skilled in the art without departing from the spirit and scope of the invention as hereinafter claimed.

What is claimed is:

1. In a method for the image capture of data from the face of documents having background patterns or illustrations of lesser opacity than the opacity of the medium of which the data is formed, the step of:
   directing a first light at a back side of a document of intensity sufficient to travel through said document and render said patterns or illustrations substantially invisible to image capture, thereby to enhance the image capture of said data;
   concomitantly directing a second light at the front side of said document; and
   capturing the image data on said document from only one of said sides.

2. The method of claim 1 wherein said light is from a fluorescent light source.

3. Apparatus for enhancing the image capture of data from the face of documents having background patterns or illustrations of lesser opacity than the opacity of the medium of which the data is formed, said apparatus comprising:
   means for transporting each of said documents in a transport path past a viewing station operative for capturing document data only from one side of said transport path;
   image capture means disposed in front of said viewing station for capturing the image of at least a portion of a face of said documents;
   first illumination means for illuminating a back side of said documents at said viewing station so as to render said patterns or illustrations essentially invisible to said image capture means and to enhance the image capture of said data; and
   second illumination means for concomitantly illuminating the front side of said documents.

4. The apparatus of claim 3 wherein said first illumination means comprises fluorescent light tubes of sufficient light to illuminate the back of said documents.

5. The apparatus of claim 3 wherein said first illumination means comprises light pipe means to direct light at a specific portion of said document.

6. The apparatus as defined by claim 3 wherein said data is handwritten information on the face of said documents.

7. The apparatus of claim 3 wherein said adjusting means is automatic gain control apparatus.

8. Apparatus for enhancing the image capture of data from the face of documents having background patterns or illustrations of lesser opacity than the opacity of the medium of which the data is formed, said apparatus comprising:
   means for transporting each of said documents past a viewing station;
   image capture means disposed in front of said viewing station for capturing the image of at least a portion of a face of said documents;
   first illumination means for illuminating a back side of said documents at said viewing station so as to render said patterns or illustrations essentially invisible to said image capture means and to enhance the image capture of said data;
   second illumination means for illuminating the front face of said documents; and
   means for independently adjusting the relative intensities of said first and second illumination means.

* * * * *